Feb. 20, 1934.　　　　　　C. J. STOKES　　　　　　1,948,141
CAMERA BACK AND SHUTTER
Filed July 12, 1933　　　3 Sheets-Sheet 1
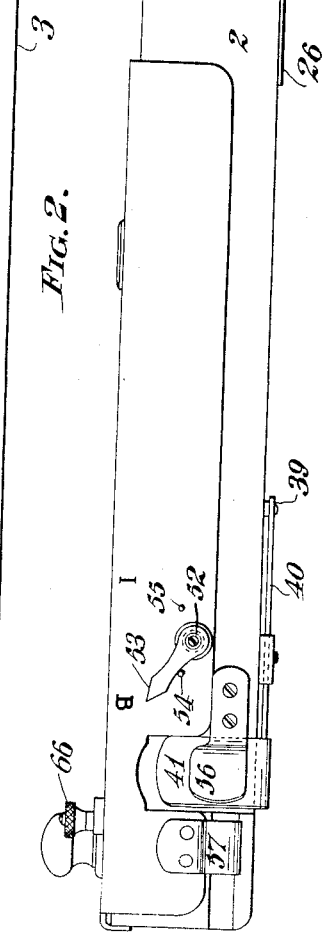
INVENTOR
CHARLES JOHN STOKES
BY
Benj. I. King.
ATTORNEY

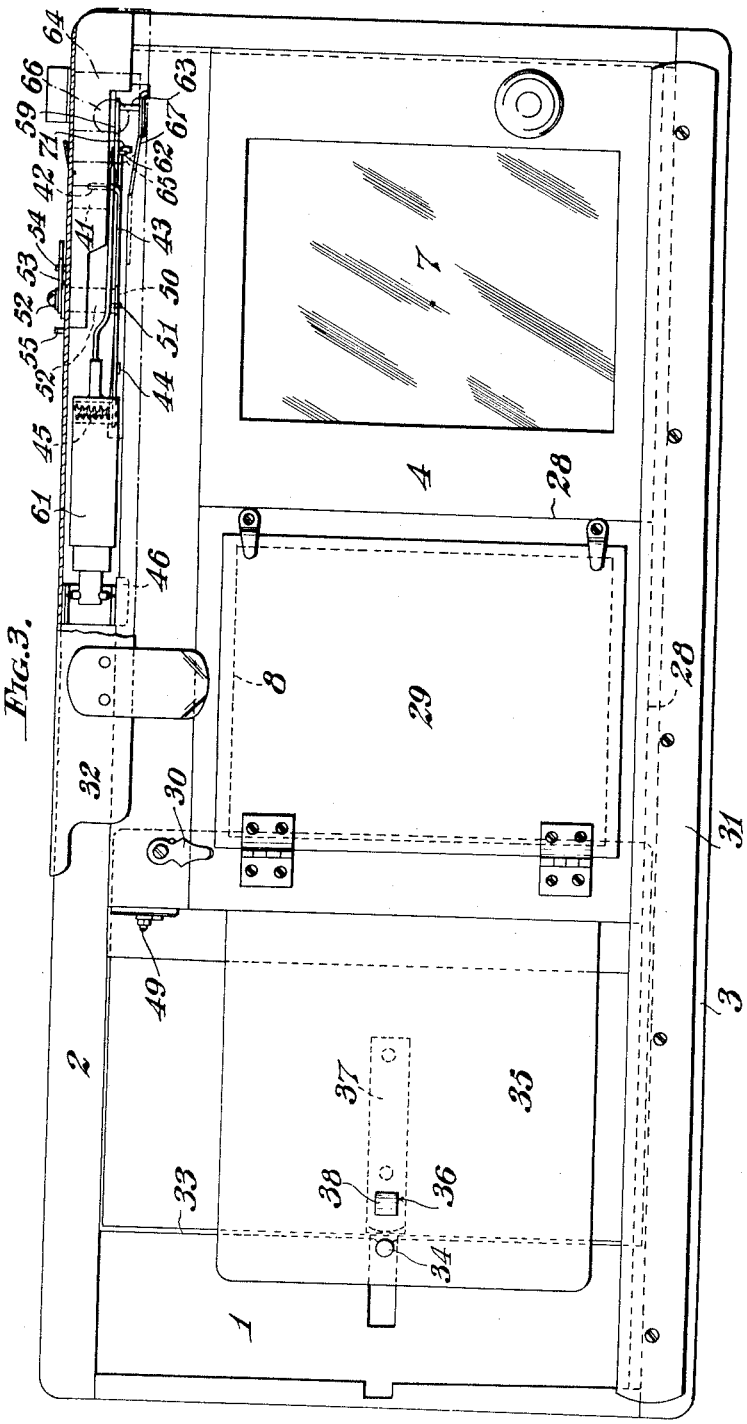
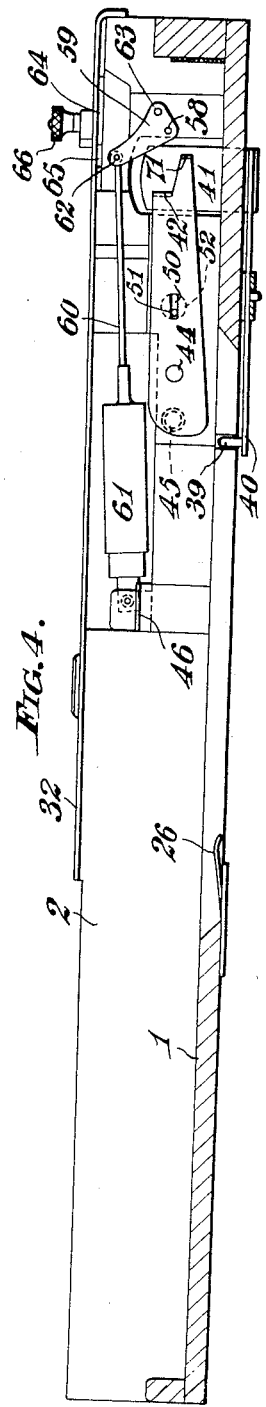

Feb. 20, 1934.    C. J. STOKES    1,948,141
CAMERA BACK AND SHUTTER
Filed July 12, 1933    3 Sheets-Sheet 3
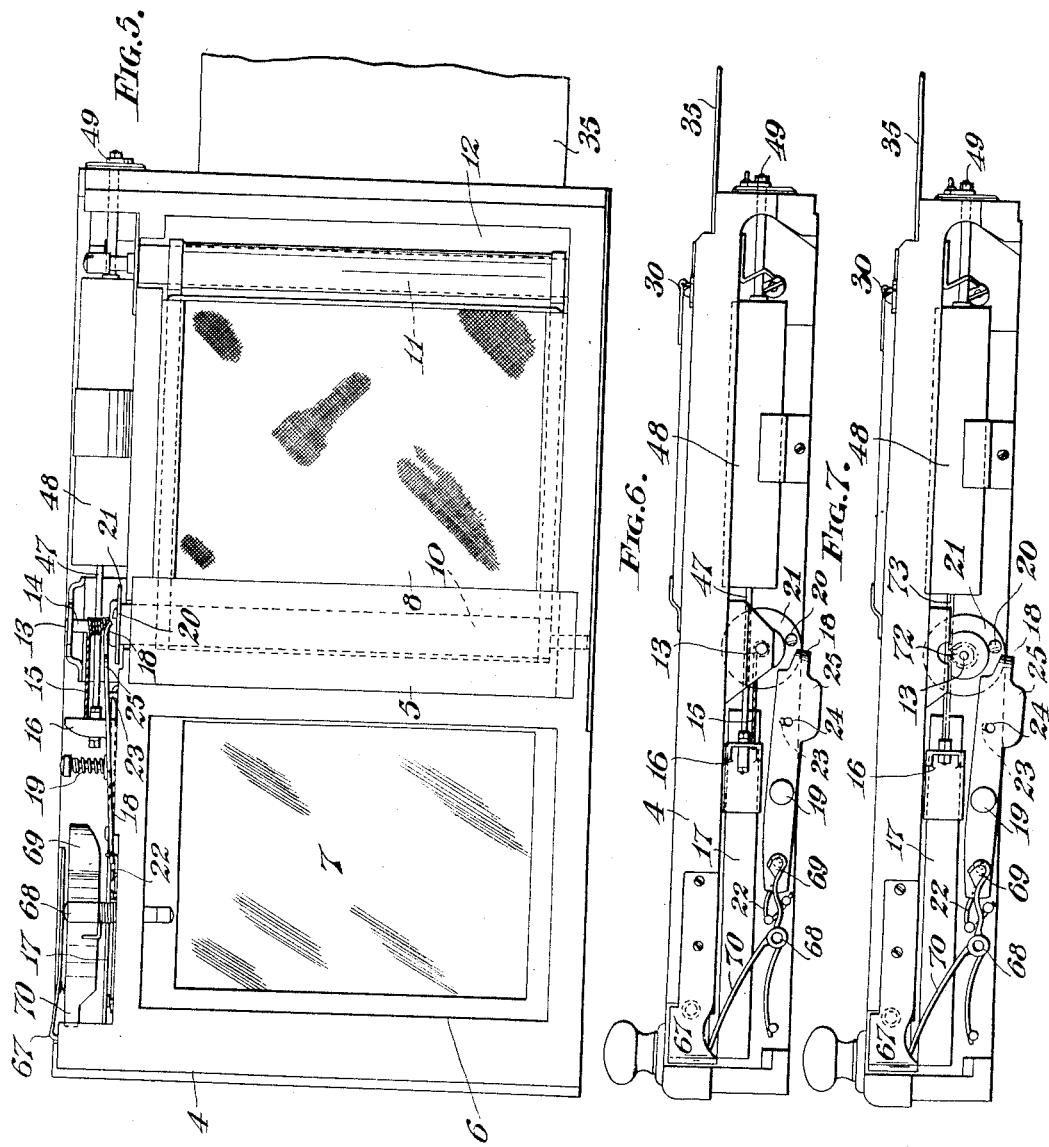
INVENTOR.
CHARLES JOHN STOKES
BY
Benj. I. King.
ATTORNEY.

Patented Feb. 20, 1934

1,948,141

UNITED STATES PATENT OFFICE 1,948,141

CAMERA BACK AND SHUTTER

Charles John Stokes, London, England, assignor of one-half to Arthur Bennett, London, England Application July 12, 1933, Serial No. 680,103, and in Great Britain June 22, 1932

10 Claims. (Cl. 95—49)

This invention relates to backs for studio cameras and has for its object to facilitate the operations of the photographer in the studio and ensure more accurate working coupled with a saving in time. In particular the invention aims at avoiding certain of the following operations which hitherto have been carried out successively and independently, viz., removal of focussing screen, insertion of dark slide, removal of dark-slide shutter, re-insertion of dark slide shutter after exposure, removal of dark slide and replacement of focussing screen ready for the next exposure; in the present invention various of these operations are performed simply by manipulation of the back element, and additionally the invention provides for automatic resetting or rewinding of the shutter, thus preventing accidental exposure caused by omission to close the shutter after the focussing operation.

The invention, in its broadest aspect, provides a back for a camera comprising a carriage slidably mounted in a frame or carrier, provision on said carriage for holding a focussing screen and a plate holder in side-by-side relation so that said focussing screen and plate holder can be brought into register with an exposure opening by sliding the carriage, an exposure shutter, and coacting means on the said carriage and frame or carrier for rewinding or resetting said shutter by the sliding motion of the carriage.

In a preferred manner of carrying out the invention there is provided a camera back, either forming a part of a camera as made for sale or else made as a fitment for existing cameras, said camera back comprising a frame in the form of a carrier wherein is slidably mounted a carriage or slide member. Said carriage or slide member incorporates or is adapted to receive a focussing screen, and is adapted to receive a dark-slide (i. e. plate holder) in a manner such that said dark slide is disposed at one side of the focussing screen, said focussing screen and dark slide both lying in the same plane. The carrier is formed with an aperture with which the focussing screen and dark slide are adapted to register selectively; that is to say, movement of the slide along the carrier in one direction brings the focussing screen into register with the aperture, whilst movement of said slide in the opposite direction moves said focussing screen aside and brings the dark slide in position ready for exposure of the plate.

The sliding member incorporates a shutter of focal-plane type, said shutter operating in front of the dark slide, and the slide member incorporates means for resetting or rewinding the shutter by co-operation with means provided on the carrier, so that the shutter is reset or rewound automatically during the movement of the slide member.

Preferably, interengagement means are provided on the dark slides and carrier to effect opening of the dark-slide shutter automatically during the movement of the slide member to the position for plate exposure, and to effect replacement of said shutter by the return movement of the said slide member.

The means for effecting release of the focal-plane shutter preferably comprises co-acting parts on the carrier and slide member so that exposure cannot take place until such time as the plate is correctly positioned behind the aperture in the carrier.

In order that the invention may be the more readily understood, reference is to be had to the following description and accompanying sheets of drawings, illustrative of a practical embodiment of the invention, and wherein:—

Figure 1 is a front view of the camera-back, and wherein an exposure has just been made.

Figure 2 is a top plan view of the said camera-back.

Figure 3 is a rear-view of the camera back.

Figure 4 is a sectional plan view illustrative of the underside of the top of said camera-back.

Figure 5 is a front view of the carriage or slide member of the camera-back and detached therefrom.

Figure 6 is a top plan view of said carriage or slide member.

Figure 7 is a view similar to Figure 6 of a modification hereinafter described.

Like numerals of reference indicate corresponding parts in the several figures.

In carrying out the invention, and referring to the drawings, there is provided a camera-back or carrier approximately of channel-section, the base 1 of which forms the front of the carrier, the walls 2 and 3 being at top and bottom and serving as guideways for a slide member 4, see Figure 3.

The slide member 4, see Figures 5 and 6, comprise an elongated rectangular frame divided by an upright 5 positioned approximately in the centre of its length. The opening 6 on one side of said central upright 5 is closed by a focussing screen 7 of ground glass or equivalent, whilst the opening 8 on the other side of the central upright 5 is adapted to be closed by means of a focal-plane shutter 9 consisting of a flexible blind, the respective ends of which are wound on to rollers respectively 10 and 11, accommodated in the central and endmost upright members 5 and 12 of the slide frame, said uprights 5 and 12 being made hollow for the purpose. Said blind or shutter 9 is formed with an opening approximately corresponding in size to that of the aperture 1a in the front 1 of the carrier across which the blind travels.

The roller 11 housed in the endmost upright 12 is spring-actuated to wind up the blind 0 on to it. The roller 10 housed in the centre upright 5 has a spindle 13 which extends through the top of the slide member 4 and has fitted upon its projecting portion a flanged sleeve 14. Upon said flanged sleeve 14 is adapted to wind a cord 15 or equivalent, the outer end of which is secured to a shoe 16 slidably mounted on a guide 17 so that it is free to traverse above that portion of the slide member 4 which is fitted with the focussing screen.

A pawl 18 pivotally mounted on the top of the slide member 4, and urged by a spring 19, is adapted to co-act with a stop 20 provided on the flange 21 of the sleeve 14 on the spindle 13 of the centrally disposed roller 10 so that as said roller 10 rotates to wind (i. e. reset) the shutter 9 against the spring action of the other roller 11, the pawl 18 snaps over the stop 20 and retains the shutter 9 in "set" condition. When the pawl 18 is released in the manner hereinafter described, it is thrown to one side by means of a spring 22, this results from an appreciable movement imparted to the pawl 18 to lift same clear of a guide pin 23 which enters a hole 24 in the pawl 18.

At the end of the rewind movement, the pawl 18 is pushed back, into its normal position, by the engagement of a projection 25, on said pawl 18, with a guide piece 26 which, affixed to the front 1 of the carrier (see Figure 1) extends into a horizontally disposed slot 27 in the front 1 aforesaid, the pawl 18 falling behind the stop 20 of the flange 21 of the sleeve 14, thereby preventing the blind 9 from unwinding.

The lateral movement of the pawl 18 obviates any possibility of same dropping back quickly and fouling the stop 20 during the exposure movement of the shutter 9.

The slide member 4 is formed with a space 28 at the rear of the shutter for the reception of a dark slide, i. e. a plate holder 29, the top edge of which is retained in position by a catch 30, whilst the bottom edge is accommodated behind a guide strip 31 extending substantially the length of the carrier and at the lower part thereof.

The top and bottom edges of the slide member 4 are accommodated behind an upper guide strip 32 and the aforesaid lower guide strip 31, as shown in Figure 3.

In operation, the dark slide 29 is inserted and the slide member 4 is moved along so as to move the focussing screen 7 out of register with the carrier aperture 1a and bring the shutter or blind 9 and dark slide 29 into register with said aperture 1a.

During this movement, the slide member 4 carries with it a tray-like member 33, same being interposed, in a slideable manner, between the front of the shutter-provided portion of the slide member 4 and the base 1 of the carrier, said tray 33, which receives therein such shutter-provided portion, being provided with a pin 34, which upstands from the outer end wall of the said tray 33, see Figure 3, and engages in a hole in the outer end of the dark-slide shutter 35.

The said tray 33 moves with the slide member 4 until an aperture 36 in the floor of the tray 33 engages with a retention device, said retention device consisting of a springy blade 37, let into the base 1 of the carrier, having a nose 38 upstanding from said blade 37 and adapted to snap into the aperture 36 in the floor of the tray 33 aforesaid. Thus the dark-slide shutter 35 is held stationary, as is also the tray 33, whilst the slide member 4 and dark-slide 29 continue to travel along, the plate in said dark slide 29 becoming thus uncovered.

When the slide member 4 reaches the end of its travel with the shutter 9 opposite the carrier aperture 1a, the projection 25 of the shutter-release pawl 18 assumes a position immediately above a lifting pin 39, which is horizontally disposed, and extends inwardly through the slot 27 in the front face of the base 1 of the carrier, see Figures 1 and 2.

The lifting pin 39 aforesaid is fixedly mounted on the inner end of a lever 40 pivotally mounted on the front of the base 1 of the carrier, whilst the outer end of said lever 40 is provided with an inturned operating member or finger 41 disposed at right angles thereto.

The operating member or finger 41 is normally maintained raised by the engagement, with the underside thereof, of a projection 42, which upstands from the outer end of an arm 43, see Figures 3 and 4, pivotally and rockably mounted at 44 on the underside of the top wall 2 of the carrier, the said arm 43 being upwardly urged by a spring 45.

Depression of the operating member or finger 41 causes the lifting pin 39 to engage the projection 25 of the shutter-release pawl 18, and lift the said pawl 18 so that the same is freed from the stop 20 of the roller 10, and thus the shutter 9, already set, as later described, is released and the exposure made.

The slide member 4 is now moved back, and in the operation of doing so the dark-slide shutter 35 is automatically retired into the dark slide 29 and closes over the plate. During such movement of the slide member 4 the shoe 16, to which is connected the resetting cord 15, abuts a projection 46 within the carrier, see Figures 3 and 4, and relative movement of the shoe 16 and the slide member 4 takes place due to the shoe 16 being held stationary. This effects resetting of the shutter 9, i. e., rewinding thereof onto the centre roller 10 ready for the next exposure. The guide 26 within the carrier serves, by contacting with the projection 25 of the pawl 18, to throw back into its normal engagement position said pawl 18 which was displaced to one side during the releasing operation, as hereinbefore described.

The dark-slide shutter 35 continues to close during the return movement of the slide member 4, and when said shutter 35 is closed, the end of the slide member 4 contacts with the outer end wall of the tray 33 and carries said tray 33 along with the slide member 4, the bottom of said tray 33 riding up the nose 38 of the springy retention device 37, thus depressing said nose 38 and allowing the slide member 4, and with it the tray 33, to complete the return travel so as to permit the dark-slide 29 to be removed.

Provision is made for imparting a desired amount of resistance to the travel of the shoe 16 in order to maintain the shutter 9 taut, and also to govern the shutter speed. For this purpose, the shoe is, as shown in Figures 5 and 6, connected to the piston rod 47 of a dash-pot 48, the same being mounted on the top of the slide member 4 and provided with an adjustable control device 39.

In order to permit of time exposure, means is provided capable of operation by the release finger or the like, to arrest the sliding shoe in a position in which the shutter is open, that is to say arrest same temporarily whilst the finger or the like remains depressed, the said shoe continuing its travel and the shutter closing when said finger is released.

Accordingly, the pivoted rockable arm 43 is provided with a longitudinally disposed slot 50 therein, and in said slot 50 engages a pin 51 which is eccentrically disposed and carried by the lower end of a rotatable member 52, see Figures 3 and 4, which extends through the upper wall 2 of the carrier and is fitted with a pointer 53, see Figures 1 and 2, movable between studs 54 and 55 indicated, respectively B and I for bulb and instantaneous, the bulb, not shown in the drawings, being interposed between the operating member or finger 41 and a member 56, which is fixedly mounted on the top wall 2 of the carrier and projects over said operating member or finger 41, expansion of the bulb, whose pipe is carried under a clip 57, actuating the lever 40 and consequently the shutter-release pawl 18.

On the underside of the upper wall 2 of the carrier there is pivotally mounted at 58 an arm 59, same at its outer end being pivotally connected to the connecting rod 60 of an oscillatory dash-pot, 61 as shown in Figures 3 and 4 and said arm 59 is provided with two pins 62 and 63 respectively, outstanding therefrom.

Slidably mounted on the inside of the upper guide strip 32 is a plate 64 having bevel 65 at the front end thereof, said plate 64 being carried by a stem slidable in a horizontally disposed slot in said upper guide strip 32, and adapted to be locked in required position by means of a thumb nut 66.

Further, on the top of the slide member 4 there is fixedly mounted, see also Figures 5 and 6, a spring blade 67 having a downturned free end, and on the top of said slide member 4 there is pivotally mounted at 68 a spring-controlled catch or trip, same having an inturned padded inner end 69, and forwardly extending arm 70 adapted, when the shoe 16 is moved back to re-setting position, to be pushed outwardly by said shoe 18 so that the inner end 69 of the catch or trip is positioned in front but clear of the front end of the shoe 18 aforesaid.

Further, the pivotal rockable arm 43 is provided with a projection 71 which depends therefrom and is positioned in advance of the upstanding projection 42 of the arm 43 aforesaid.

For instantaneous, i. e. snap-shot, exposures, the pointer 53 is moved to 55 with consequent sideways movement (through pin 51 and slot 50 engagement) of the arm 43 so that the forward projection 71 of said arm 43 is in front of the arm 70 of the catch or trip.

The side plate 64 is inwardly moved and locked by its thumb nut 66. Then on the slide member 4 being moved to exposure position, the down turned end of the springy plate 67 on said slide member 4 engages with the pin 62 of the pivoted arm 59 and forwardly pulls the plunger of the dash-pot 61 until the down turned end of said springy plate 67 contacts with the bevel 65 of the plate 64, and slides along, and is depressed by said plate 64, and is moved out of engagement with the pin 62 with consequent stopping of the outward movement of the plunger of the dash-pot 61, the travel of the plunger of the dash-pot being more or less according to the position of the bevel 65 of the plate 64 aforesaid.

Then, on depressing the operating member or finger 40, the release pawl 18 is freed from the stop 20 of the roller 10, and the shoe 16 moves forwardly but is caught and held by the front end 69 of the catch or trip to retain the shutter open.

The catch or trip now turns about the pin 69, and since the arm 70 bears upon the pin 63 of the arm 59 a turning movement is imparted to said arm 59, and when the latter, and consequently the arm 70 reach a predetermined position, the catch or trip 69 will release the shoe 16 to allow the shutter to continue its travel. The period of time during which the shutter thus remains open is governed by the portion of the turning motion of the arm 59 during which it is under the control of the pneumatic register 61, the adjustment being effected by sliding the plate 64 as above described.

For a time exposure, the pointer 53 is moved from 55 to 54, with consequent reverse movement of the arm 43, so that the projection 71 of the said arm 43 is behind the arm 70 of the catch or trip, after moving the slide member 4 to exposure position. Then on the operating member or finger 40 being depressed, the release pawl 18 is moved from the step 20 or the roller 10 and the shutter is allowed to travel but the shoe 16 is arrested by the front end 69 of the catch or trip at a position corresponding to the open position of the shutter, the spring-catch or trip being held by the projection 71 of the arm 43, when pressure is removed from the operating member or finger 40 the arm 43 rises to clear the projection 71 from the arm 70 of the catch or trip, so that under the action of its spring, said catch or trip moves to a position in which its front end 69 is clear of the shoe 16 which then travels forwardly with consequent covering movement of the shutter.

Although it is preferred that the spindle of the central roller be provided with a flanged sleeve and cord for rewinding, yet it is to be understood that as shown in Figure 7 said spindle 13 may be fitted with a pinion 72 engaged with and actuated by a freely mounted rack 73 to one end of which is attached the shoe 16.

It will be seen that in the construction above described all that is necessary in order to make an exposure is, insert the dark-slide, focus the picture, move the slide member into a position in which the plate is in register with the aperture in the carrier and then operate the shutter release member or finger. After exposure the slide member is simply slid back and the dark-slide removed. The exposure shutter becomes automatically reset during the backward movement of the slide member.

I claim:—

1. A back for a camera comprising a carriage slidably mounted in a carrier, provision on said carriage for holding a focussing screen and a plate holder in side-by-side relation so that said focussing screen and plate holder can be brought into register with an exposure opening by sliding the carriage, an exposure shutter, and coacting means on the said carriage and carrier for rewinding or resetting said shutter by the sliding motion of the carriage.

2. A back for a camera comprising a carriage slidably mounted in a carrier, a focussing screen and a plate holder mounted in said carriage in side-by-side relation and positioned for selectively registering with an exposure opening in the carrier, an exposure shutter mounted on the carriage in front of the plate holder, coacting means on the carriage and on the carrier for rewinding or resetting the shutter by the sliding motion of the carriage, and coacting means on the carrier and carriage for effecting release of the shutter.

3. A back for a camera comprising a carriage slidably mounted in a carrier, a focussing screen and a plate holder mounted in said carriage in side-by-side relation and positioned for selectively registering with an exposure opening in the carrier, an exposure shutter mounted on the carriage in front of the plate holder, coacting means on the carriage and on the carrier for rewinding or resetting the shutter by the sliding motion of the carriage, and coacting means on the carrier and carriage for effecting release of the shutter only when the plate holder is correctly positioned in register with the exposure opening.

4. A back for a camera comprising a carriage slidably mounted in a carrier, a plate holter mounted in said carriage and comprising a dark slide having a shutter adapted to be drawn out, means on the carriage for engaging said dark slide shutter and holding same to effect withdrawal of said dark slide shutter during sliding motion of the carriage to a position for plate exposure, a focussing screen mounted in the carriage in side-by-side relation with the plate holder, an exposure shutter mounted on the carriage in front of the plate holder, coacting means on the carriage and on the carrier for rewinding or resetting the shutter by sliding motion of the carriage, and coacting means on the carrier and carriage for effecting release of the shutter.

5. A back for a camera comprising a carriage slidably mounted in a carrier, a focussing screen and a plate holder mounted in said carriage in side-by-side relation and positioned for selectively registering with an exposure opening in the carrier, an exposure shutter mounted on the carriage in front of the plate holder and consisting of an apertured blind, the respective ends of which are wound on to spring-energized and non-energized rollers, means for rotating the non-energized roller by sliding motion of the carriage in order to rewind the shutter, a ratchet wheel on the non-energized roller, a pawl to engage the teeth of said ratchet wheel, and coacting means on the carrier and carriage to release the shutter by lifting the pawl.

6. A back for a camera comprising a carriage slidably mounted in a carrier, a focussing screen and a plate holder mounted in said carriage in side-by-side relation and positioned for selectively registering with an exposure opening in the carrier, an exposure shutter mounted on the carriage in front of the plate holder and consisting of an apertured blind, the respective ends of which are wound on to the spring-energized and non-energized rollers, means for rotating the non-energized roller by sliding motion of the carriage in order to rewind the shutter, a ratchet wheel on the non-energized roller, a pawl to engage the teeth of said ratchet wheel, coacting means on the carrier and carriage to release the shutter by lifting the pawl, and means for momentarily retaining the shutter in a position in which the aperture therein is in register with the exposure opening.

7. A back for a camera comprising a carriage slidably mounted in a carrier, a focussing screen and a plate holder mounted in said carriage in side-by-side relation and positioned for selectively registering with an exposure opening in the carrier, an exposure shutter mounted on the carriage in front of the plate holder and consisting of an apertured blind, the respective ends of which are wound on to spring-energized and non-energized rollers, a pulley on the non-energized roller, a cord wound on said pulley, a shoe fixed on the free end of said cord, a projection on the carrier for engaging said shoe and winding the shutter on to the non-energized roller by imparting a sliding motion to the carrier, a ratchet wheel on the non-energized roller, a pawl to engage the teeth of said ratchet wheel, and coacting means on the carrier and carriage to release the shutter by lifting the pawl.

8. A back for a camera comprising a carriage slidably mounted in a carrier, a focussing screen and a plate holder mounted in said carriage in side-by-side relation and positioned for selectively registering with an exposure opening in the carrier, an exposure shutter mounted on the carriage in front of the plate holder and consisting of an apertured blind, the respective ends of which are wound on to spring-energized and non-energized rollers, a pinion fixed on the non-energized roller, a freely mounted toothed rack permanently engaged with said pinion, a shoe fixed on one end of said rack, a projection on the carrier for engaging said shoe and winding the shutter on to the non-energized roller by imparting a sliding motion to the carrier, a ratchet wheel on the non-energizing roller, a pawl to engage the teeth of said ratchet wheel, and coacting means on the carrier and carriage to release the shutter by lifting and throwing aside the pawl.

9. A back for a camera comprising a carriage slidably mounted in a carrier, a focusing screen and a plate holder mounted in said carriage in side-by-side relation and positioned for selectively registering with an exposure opening in the carrier, an exposure shutter mounted on the carriage in front of the plate holder and consisting of an apertured blind, the respective ends of which are wound on to spring-energized and non-energized rollers, a pulley on the non-energized roller, a cord wound on said pulley, a shoe fixed on the free end of said cord, a projection on the carrier for engaging said shoe and winding the shutter on to the non-energized roller by imparting a sliding motion to the carrier, a ratchet wheel on the non-energized roller, a pawl to engage the teeth of said ratchet wheel, coacting means on the carrier and carriage to release the shutter by lifting the pawl, a movable trip member adapted to arrest the shoe and momentarily retain the shutter in exposing position, and a pneumatic resistor operatively coupled to said trip member to govern the period of time during which the shutter remains open.

10. A back for a camera comprising a carriage slidably mounted in a carrier, a focussing screen and a plate holder mounted in said carriage in side-by-side relation and positioned for selectively registering with an exposure opening in the carrier, an exposure shutter mounted on the carriage in front of the plate holder and consisting of an apertured blind, the respective ends of which are wound on to spring-energized and non-energized rollers, a pinion fixed on the non-energized roller, a freely mounted toothed rack permanently engaged with said pinion, a shoe fixed on one end of said rack, a projection on the carrier for engaging said shoe and winding the shutter on to the non-energized roller by imparting a sliding motion to the carrier, a ratchet wheel on the non-energized roller, a pawl to engage the teeth of said ratchet wheel, co-acting means on the carrier and carriage to release the shutter by lifting and throwing aside the pawl, a movable trip member adapted to arrest the shoe and momentarily retain the shutter in exposed position and a pneumatic resistor operatively coupled to said trip member to govern the period of time during which the shutter remains open.

CHARLES JOHN STOKES.